United States Patent
Rauch

(10) Patent No.: US 7,084,873 B2
(45) Date of Patent: Aug. 1, 2006

(54) SYSTEM, METHOD AND COMPUTER PROGRAM PRODUCT FOR DISPLAYING AND/OR COMPRESSING DIGITAL DATA

(75) Inventor: Juergen Rauch, Buchloe (DE)

(73) Assignee: Agere Systems Inc., Allentown, PA (US)

( * ) Notice: Subject to any disclaimer, the term of this patent is extended or adjusted under 35 U.S.C. 154(b) by 148 days.

(21) Appl. No.: 10/175,588

(22) Filed: Jun. 19, 2002

(65) Prior Publication Data

US 2003/0030641 A1    Feb. 13, 2003

(30) Foreign Application Priority Data

Jan. 8, 2001  (EP) .................................. 01118479

(51) Int. Cl.
  *G06T 11/00*   (2006.01)
(52) U.S. Cl. ...................................... 345/467; 345/469
(58) Field of Classification Search ................ 345/467, 345/469
  See application file for complete search history.

(56) References Cited

U.S. PATENT DOCUMENTS

| | | | |
|---|---|---|---|
| 3,936,664 A | | 2/1976 | Sato |
| 4,228,510 A | * | 10/1980 | Johnson et al. ............... 345/18 |
| 4,622,546 A | * | 11/1986 | Sfarti et al. .................. 345/551 |
| 5,021,974 A | * | 6/1991 | Pisculli et al. ............... 345/467 |
| 5,027,304 A | | 6/1991 | Jeng et al. |
| 5,280,577 A | * | 1/1994 | Trevett et al. ............... 345/469 |
| 5,317,684 A | * | 5/1994 | Penna ......................... 345/467 |
| 5,831,636 A | | 11/1998 | Merchant et al. |
| 5,982,387 A | * | 11/1999 | Hellmann .................... 345/469 |
| 6,377,261 B1 | * | 4/2002 | Fernandez et al. .......... 345/467 |
| 6,697,070 B1 | * | 2/2004 | Katsura et al. ............. 345/469 |

FOREIGN PATENT DOCUMENTS

| EP | 0 130 245 B1 | 1/1985 |
|---|---|---|
| EP | 0 389 890 B1 | 10/1990 |

* cited by examiner

*Primary Examiner*—Richard Hjerpe
*Assistant Examiner*—Motilewa Good-Johnson

(57) ABSTRACT

The invention relates to a system, method and computer program product for compressing and/or displaying digital data. The system includes a storage medium for storing a plurality of instruction sequences representing displayable characters, a display for displaying these characters, and a receiver for receiving at least a first code symbol being assigned to the first one of the instruction sequences. The first instruction sequence represents the first character displayable in a bitmap, wherein first instruction sequence defines a line pattern. Decomposing, storing and restoring a Chinese character, e.g., into a line pattern is advantageous as being memory saving and fast. The invention is particularly applicable for mobile phones having restricted memory space.

17 Claims, 3 Drawing Sheets

SYSTEM, METHOD AND COMPUTER PROGRAM PRODUCT FOR DISPLAYING AND/OR COMPRESSING DIGITAL DATA

CROSS-REFERENCE TO RELATED APPLICATION

This application claims priority of European Patent Application No. 01 118479.3, which was filed on Aug. 1, 2001.

BACKGROUND OF THE INVENTION

The invention relates to a system, method and computer program product for displaying and/or compressing digital data in general and to a system, method and computer program product for displaying characters assigned to code symbols in particular.

Graphic displaying is a key element of user-machine interfacing in handling digital data. For example, it has become very popular in the last years to communicate by transmitting text messages and also images. The most popular example of this type of communication is an e-mail.

In recent time such a written or more generally speaking visible or non-audible telecommunication has also conquered the field of mobile communication. The most popular example is the so-called short message service (SMS). However, the transmission of e-mails from and to mobile terminals, like mobile phones or personal digital assistants (PDA) is possible too.

Furthermore, an extremely hard world-wide competition between producers and between service providers provides for an ever-increasing demand and supply of services and comfort in telecommunication.

For example it is desirable to transmit and display Japanese, Chinese or Arabic characters with mobile terminals, e.g. to enable an SMS or e-mail contact between people not using Latin characters in there mother tongue. However, such characters should also be displayed when simply loading data, e.g. from an electronic phonebook storing characters or words in the terminal. Those aspects become dramatically important as Asia is expected to be one of the fastest growing markets for telecommunication technologies in the next decades.

However, a limiting factor for such demands is the memory space of the electronic equipment which is most serious for mobile terminals, as on the other hand there is an ever-increasing and obviously counter-acting demand for miniaturizing the terminals, phones and other mobile telecommunication equipment.

Typically, mobile terminals already have pixel-oriented graphic displays which are generally suitable to display nearly any kind of characters and even small images as well as Latin letters. Here, the letters or characters are drawn on the display by creating a pixel-oriented image in a sub-array of pixels of the display. Therefore, letters, characters or images are also stored pictorially, i.e. by storing them as graphic bitmap. When a message is sent from one to another terminal, merely a code sequence comprising a code symbol for each letter is physically transmitted instead of the pictorial representation of the letter. Those code symbols are allocated to an address in the memory of the receiving terminal where the pictorial representation is stored and the letter is transmitted to the display.

Therefore, digital data representing or embodying the letters are typically compressed to save storage space. E.g. runlength encoding or other known compressing algorithms like the Lempel-Ziv-Welch approach or the like are used for this.

However, pixel-oriented compression algorithms involve another serious disadvantage, namely they are highly computer-bound.

SUMMARY OF THE INVENTION

Therefore, it is an object of the present invention to provide a system, method and computer program product for storing and/or displaying digital data which make efficient use of storage space and/or computing power.

A further object of the present invention is to provide a system, method and computer program product which is adapted to the control of the display.

Another object of the present invention is to provide a system, method and computer program product which is suitable for compressing and/or displaying a variety of different characters, letters and/or images.

Still a further object of the present invention is to provide a system, method and computer program product which avoids or at least reduces the disadvantages of the prior art.

The object of the invention is achieved in a surprisingly simple manner. Preferred embodiments are subject of the dependent claims.

In particular, the invention is based on decomposing a character represented by a bitmap image to a line pattern which is stored by means of an instruction sequence defining or representing said line pattern. Advantageously, a high compression rate is achieved, saving read only memory (ROM) space.

Therefore, a first aspect of the invention is realized by a data processing system comprising a storage medium or storage means and a plurality of instruction sequences which represent displayable characters, e.g. Japanese, Chinese, Arabian or alike characters or letters. It is clear that the invention is particularly suitable for such simple characters as they generally consist of straight lines or at least can be decomposed into straight lines. However also small or even large images or a portion thereof can be decomposed, stored and restored according to the invention. Furthermore, the system comprises display means for displaying said characters, preferably by executing said instruction sequences. A receiver is provided to receive at least a first code symbol which is assigned to a first of said displayable characters. Preferably a plurality of such code symbols are sent by a transmitter, received by said receiver and assigned to the respective characters being stored in the receiving system.

The first character is represented by a first of said instruction sequences which is preferably physically stored in or on the storage medium. Said first instruction sequence is read out from the storage medium and the first character is preferably written in a screen buffer and preferably displayed by said display. Said first instruction sequence defines a line pattern, which preferably consists of or comprises a single line, a group of lines or the like.

The data processing system according to the invention is preferably comprised by a mobile terminal or mobile phone. However, it may also be part of a wire-bound terminal or phone or any other type of electronic equipment storing and displaying such characters.

Representing and/or storing the characters by means of line patterns defined by simple instructions sequences is advantageous as this is memory saving. Furthermore, displaying the character by transferring and tracing said line pattern instead of a bit-by-bit data transfer to the screen or screen buffer is advantageously simple, fast and efficient.

A second aspect of the same invention is directed to decomposing the digital data, preferably incorporating a letter, character or image by means of a bitmap to a line pattern and to store it. Therefore, this second aspect of the invention provides a system, method and computer program product for compressing and storing the digital data in a form adapted to be used with the system, method or computer program product according to the first aspect of the invention. It is clear that both aspects are linked together.

The system according to the second aspect of the invention comprises means for decomposing at least a portion or portions of the digital data, in particular including one or more characters, letters, images or portions thereof to a line pattern, a line or a group of lines. This system further comprises means for assigning an instruction sequence to said line pattern. E.g. a character represented by a bitmap is retraced by the instruction sequences, e.g. including commands to draw the lines comprised by the line pattern. The instruction sequence is stored on or in storage means or an electronic memory.

Referring back to the first aspect of the invention, said first character is preferably representable or represented by a two-dimensional image, e.g. in a bitmap. However, the invention is not restricted to two-dimensional images or characters, also three-dimensional or even higher multi-dimensional images or characters can be decomposed and stored and recovered equivalently according to the invention.

Referring now to both aspects of the invention, said first instruction sequence preferably comprises a start command defining a start position in the bitmap and a first move command for tracing of a first line of the line pattern from the start position to a first end position in the bitmap. Therefore, said first move command comprises a first direction instruction and a first length instruction. Advantageously, this embodiment realizes a very storage space efficient possibility to draw a, preferably straight, line.

Adapted to the complexity of the characters or images, said first direction instruction comprises two, three or more bits for defining different directions.

In a further preferred embodiment, the size of the first length instruction is adapted to the size of the bitmap. Most preferably, the size of the length instruction is at least as large as necessary for tracing a line from one end of the bitmap to the other end in the largest dimension. Consequently, the first length instruction comprises a number of bits which is preferably three, four, five, six or more.

Preferably, the first instruction sequence further comprises a first colour instruction which preferably comprises one bit for defining a black and white image or more than one bit for a grey scale or colour image.

In a further preferred embodiment of the invention the first instruction sequence comprises a second move command or a plurality of move commands, wherein each of said move commands comprises a direction instruction, a length instruction and preferably a colour instruction.

Most preferably, a continuous string of lines is defined by said first instruction sequence, such that each line begins at the same pixel where the proceeding line ends. Herewith it becomes clear that the invention is also well suitable for running a plotter. Preferably, one or more polygon-like patterns are defined, wherein the polygons can be open or closed and may cut across. Therewith, even a complex line pattern can be traced or drawn with said first instruction sequence.

Advantageously 6 to 12 bits, preferably 8, 9 or 10 bits are used for each move command to trace any line in a typical bitmap used for a mobile terminal.

Often some sub-patterns or character elements are part of more than one character or are repeated more than once in the same character, letter or image. Therefore, in a most preferred embodiment, subsequences are defined representing those character elements or character portions and are preferably stored in a, preferably hierarchic look-up table. Those subsequences are then preferably stored only once, although being used more than once. Consequently, storage space can be saved, e.g. for displaying Chinese characters, as many characters include the same character portions or glyphs.

Those subsequences are preferably representing simple or common geometrical figures, e.g. rectangles, polygons, circles or the like. This is particularly advantageous as such geometrical figures are also used as drawing primitives for driving the preferably graphic display. Therefore, preferably at least one or some subsequences are adapted or are equivalent to those drawing primitives. Consequently, no or at least less decompression is required, thereby saving random access memory (RAM) space. Moreover, the system, method and computer program product is extremely fast.

Preferably, the first instruction sequence comprises one or more indicators indicating and/or addressing one or more subsequences. Those subsequence indicators preferably point to the addresses in the look-up table where the respective subsequences are stored. Furthermore, the instruction sequence may contain a flag which preferably uses one bit, such that a decision whether the following command contains a move command or a pointer to a subsequence can be drawn.

Preferably the method according to the invention is hardware or software implemented.

The invention is described in more detail and in view of preferred embodiments hereinafter. Reference is made to the attached drawings.

BRIEF DESCRIPTION OF THE DRAWINGS

Below, the invention will be explained with reference to some drawings, which are intended for illustration purposes only and not to limit the scope of protection as defined in the accompanying claims.

DETAILED DESCRIPTION OF THE INVENTION

In the following a conversion of a character 1 represented by a pixel image in a bitmap into an instruction sequence is explained by way of a first embodiment of the invention.

The general form of an instruction sequence according to this exemplary first embodiment is:

StartPosition, Command_1, Command_2, . . . , Command_N.

Therein the StartPosition command defines a start position in the bitmap 2 and a plurality of N commands is defined by Command_i with i=1, 2, ..., N.

In detail, the start position is defined by an X coordinate and a Y coordinate reading:
StartPosition=(X-coordinate, Y-coordinate)

Each command Command_i comprises a flag IsSubSequence and a move command. Furthermore, commands Command_i, or more specifically each move command comprise a direction instruction Direction, a 1-bit color instruction PenUpDown defining a black/white decision and a length instruction Length. The flag IsSubSequence is a 1-bit flag indicating if the following bits describe an address of a subsequence in a look-up table or a move command. Thus the structure of the commands command_i reads:
Command_i=(IsSubSequence, Direction, PenUpDown, Length).

In particular, the direction instruction Direction defines the direction where to move. Three bits as used in this embodiment are sufficient to define south, north, west, east, southwest, southeast, northwest, northeast. However, other number of bits, e.g. 2, or more than 3 are also practicable for the invention.

Furthermore PenUpDown describes whether the pixels on the traced line are black or white. For this purpose one bit is sufficient. However, also color images or characters can be decomposed and restored with the invention. In such a further embodiment the color instruction PenUpDown includes a plurality of bits, e.g. 8 bits for an image with 256 colors.

Figure 1:
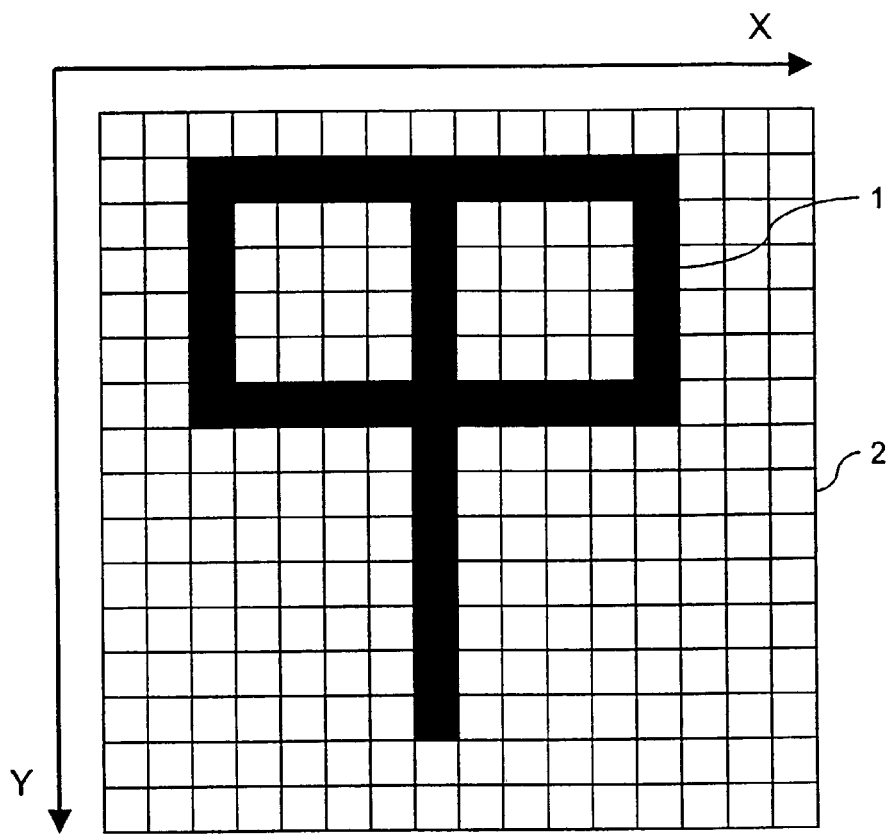
FIG. 1 a displayable character in a 16×16 pixel bitmap.
Figure 2:
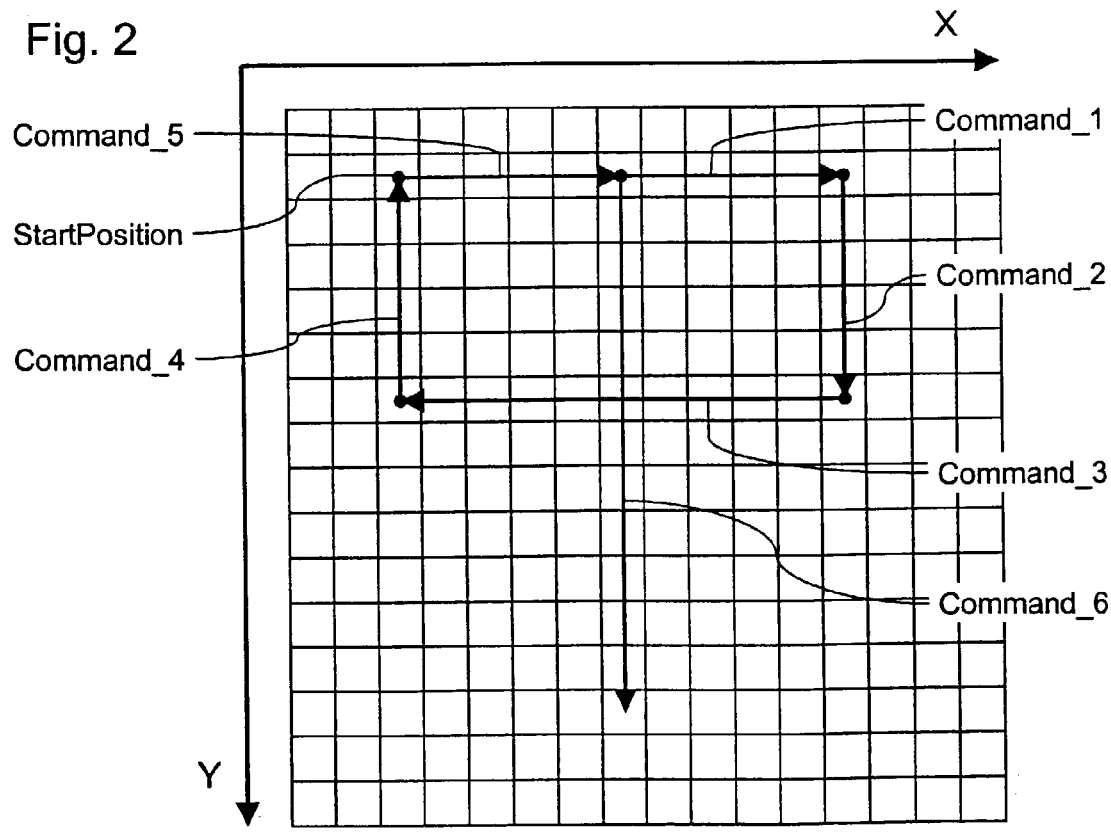
FIG. 2 an arrow diagram illustrating the tracing of the character of FIG. 1, FIG. 3 the displayable character of FIG. 1 decomposed in a first and second character element, FIG. 4 an arrow diagram illustrating the tracing of the first character element of FIG. 3 and FIG. 5 an arrow diagram illustrating the tracing of the second character element of FIG. 3.

The length instruction Length defines the number of pixels in the bitmap 2 to move. The number NL of bits of the length instruction is adapted to the largest extension L of the bitmap 2. Therefore it reads $2^{NL} \geq L$. E.g. for a 16×16 bitmap, i.e. L=16, NL=4 bits is sufficient. In the following an example how to decompose a character 1 in a 16×16 pixel sized monochrome bitmap 2 is described. The bitmap 2 with the character 1 is shown in FIG. 1. The invention, however, is suitable to compress and restore bitmaps of any size and color. FIG. 2 illustrates a line pattern as defined or traced by the instruction sequence representing the character 1 of FIG. 1 reading as follows:

| Instruction | Value | Memory Consumption |
| --- | --- | --- |
| StartPosition: | | |
| X-coordinate | = 3 | 4 bit |
| Y-coordinate | = 2 | 4 bit |
| Command_1: | | |
| IsSubSequence | = 0 | 1 bit |
| Direction | = east | 3 bit |
| PinUpDown | = down | 1 bit |
| Length | = 11 pixel | 4 bit |
| Command_2: | | |
| IsSubSequence | = 0 | 1 bit |
| Direction | = south | 3 bit |
| PinUpDown | = down | 1 bit |
| Length | = 6 pixel | 4 bit |
| Command_3: | | |
| IsSubSequence | = 0 | 1 bit |
| Direction | = west | 3 bit |
| PinUpDown | = down | 1 bit |
| Length | = 11 pixel | 4 bit |
| Command_4: | | |

-continued

| Instruction | Value | Memory Consumption |
| --- | --- | --- |
| IsSubSequence | = 0 | 1 bit |
| Direction | = north | 3 bit |
| PinUpDown | = down | 1 bit |
| Length | = 6 pixel | 4 bit |
| Command_5: | | |
| IsSubSequence | = 0 | 1 bit |
| Direction | = east | 3 bit |
| PinUpDown | = down | 1 bit |
| Length | = 6 pixel | 4 bit |
| Command_6: | | |
| IsSubSequence | = 0 | 1 bit |
| Direction | = south | 3 bit |
| PinUpDown | = down | 1 bit |
| Length | = 13 pixel | 4 bit |

The total memory consumption of the instruction sequence is 62 bits. Compared to the 256 bit memory consumption of the bitmap 2 we have in this particular case a compression ratio of more than 75%.

Figure 3:
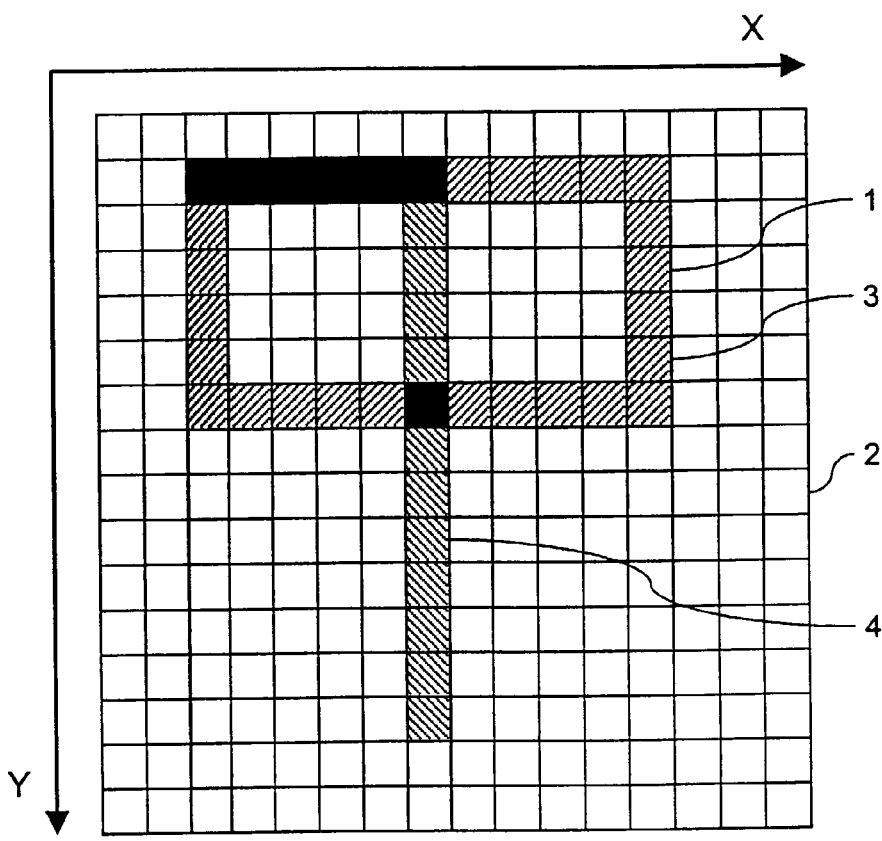
Figure 4:
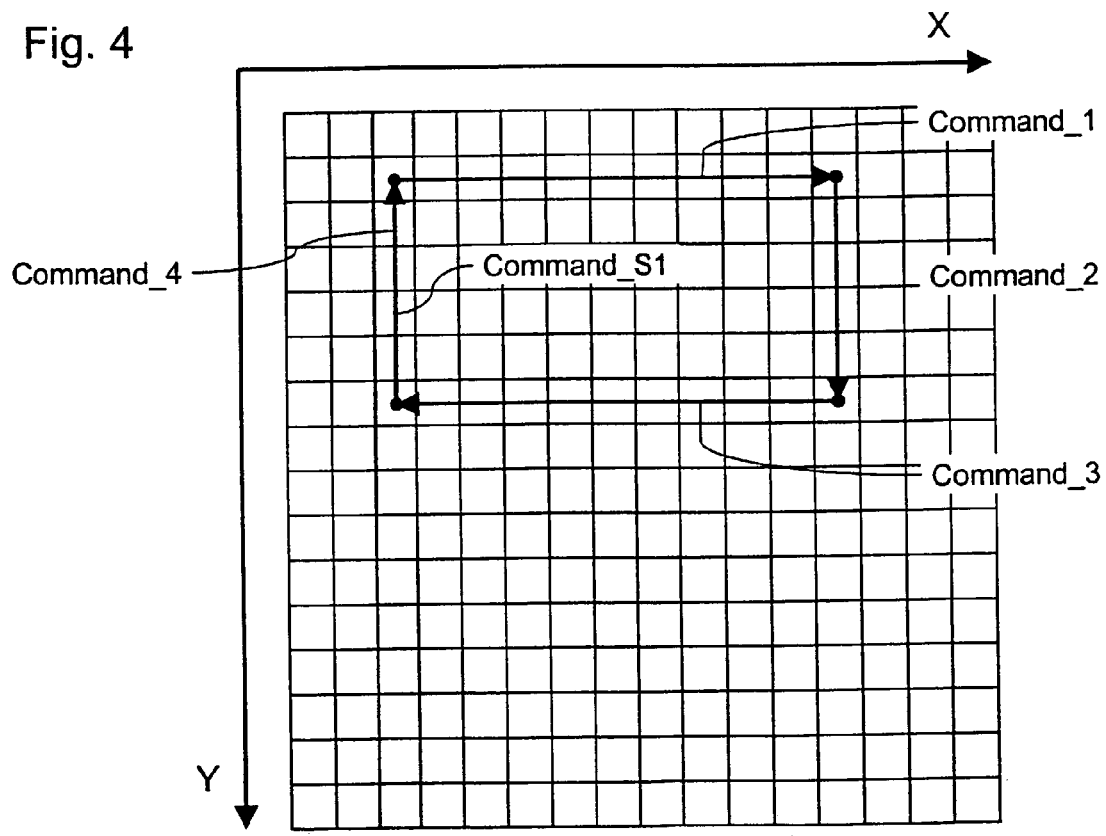
Figure 5:
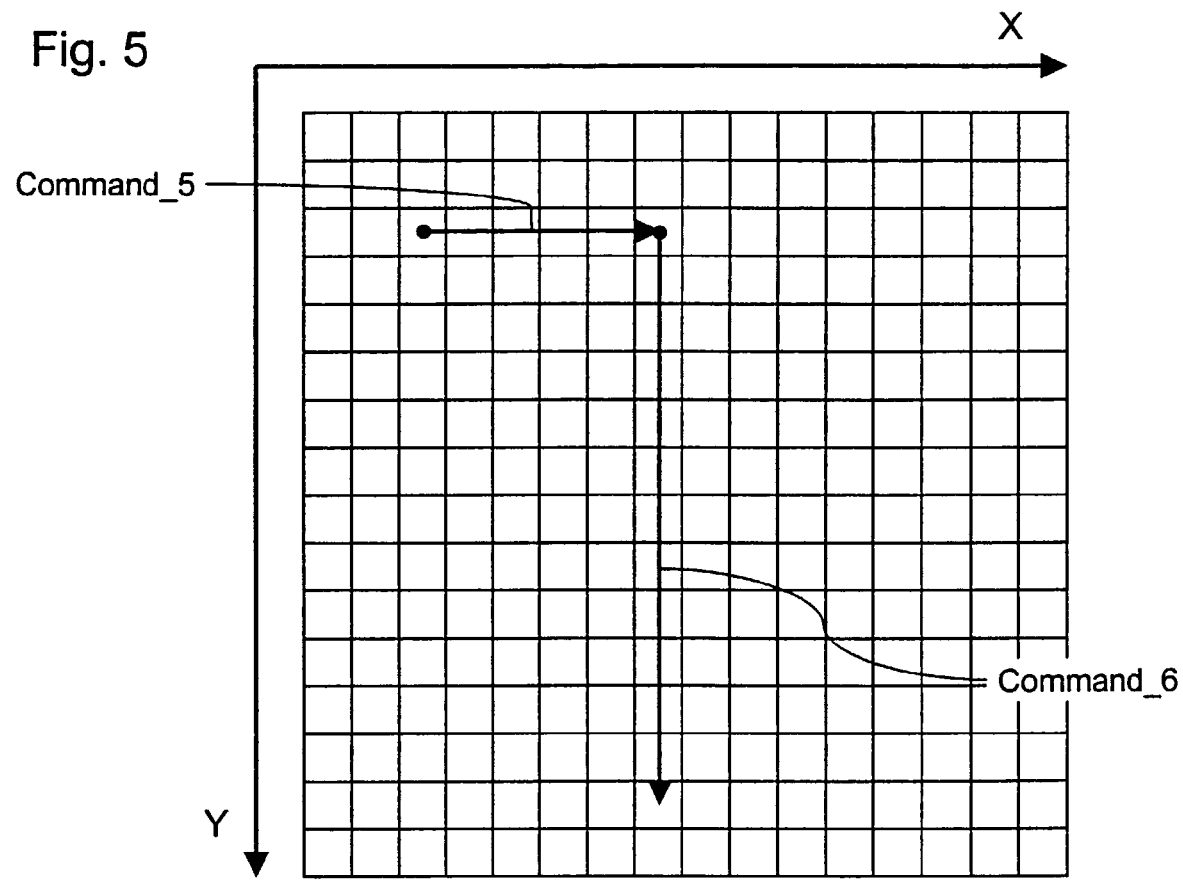

Referring to FIGS. 3 to 5 it is shown how the same character 1 as shown in FIG. 1 is decomposed and stored according to a second embodiment of the invention using a subsequence Command_S1 as follows.

To increase the compression rate, multiple storage of identical character elements is avoided. Some chinese characters contain the same bitmap patterns in different combinations. The invention detects identical patterns and stores those only once or at least less times than the number or characters including that pattern. Those patterns are referred to also as glyphs or character elements and those are stored using reusable subsequences. In FIG. 3 a first and second character element 3, 4 are shown with different hatch. The fully black pixels belong to both character elements.

| Instruction | Value | Memory Consumption |
| --- | --- | --- |
| StartPosition: | | |
| X-coordinate | = 3 | 4 bit |
| Y-coordinate | = 2 | 4 bit |
| Command_S1: | | |
| IsSubSequence | = 1 | 1 bit |
| SubSequenceIndex | = aByte | 8 bit |
| Command_5: | | |
| IsSubSequence | = 0 | 1 bit |
| Direction | = east | 3 bit |
| PinUpDown | = down | 1 bit |
| Length | = 6 pixel | 4 bit |
| Command_6: | | |
| IsSubSequence | = 0 | 1 bit |
| Direction | = south | 3 bit |
| PinUpDown | = down | 1 bit |
| Length | = 13 pixel | 4 bit |

Herein, the SubSequenceIndex indexes into a lookup table that points to the subsequence. The subsequence comprises the commands Command_1 to Command_4 of the first embodiment tracing the first character element 3 of rectangular shape as shown in FIGS. 3 and 4. Commands Command_5 and Command_6 as shown in FIG. 5 are equivalent as in the first embodiment.

The memory consumption of this instruction sequence is 35 bit. However, additional storage space is needed for storing the subsequence itself. Therefore an average storage space of 35 bit+K is provided, wherein K is the size of the SubSequence plus the size of the SubSequenceIndex divided by the number of characters reusing the subsequence. It is clear that an instruction sequence can also comprise more than one different and/or same subsequence.

To display the compressed character 1 the following steps are taken:

Reading out the instruction sequence from the storage medium or memory.
Resolving the subsequence or subsequences.
Accessing the screen buffer using drawing primitives.
Sending the buffer contents to the physical display.

For optimum performance and to avoid searching time, a set of instruction sequences is organized in lookup tables such that the character code itself points to the corresponding instruction sequence.

To resolve the subsequences those are accessible via a lookup table in the memory of the system.

On one hand it is possible to use a bit block transfer function to copy each bitmap 2 byte by byte from the memory to the screen buffer. However, in those embodiments of the invention described above, the instruction sequences allow or provide direct writing into the screen buffer using drawing primitives. Therefore, the move commands and/or the subsequences represent character elements 3, 4 which are equivalent to the drawing primitives, e.g. lines, rectangles or circles. This is advantageous as no decompression is necessary and thus the transfer from the storage to the screen buffer and the physical display is fast. Furthermore, random access memory (RAM) is saved.

Sending the buffer contents to the physical display is provided by a display driver which sends the contents of the screen buffer to any display.

In particular, the invention is applicable to mobile terminals or phones, e.g. GSM or UMTS phones, personal digital assistants (PDA), electronic measuring equipment, plotters or any other electronic device displaying Arabian, Chinese or equivalent characters 1 or letters.

It will be appreciated that the above-described embodiment of the system according to the present invention has been set forth solely by way of example and illustration of the principles thereof and that further modifications and alterations may be made therein without thereby departing from the spirit and scope of the invention.

What is claimed is:

1. A system for displaying digital data, said system comprising:
   a storage medium for storing a plurality of instruction sequences representing displayable characters;
   a display for displaying said characters;
   a receiver for receiving at least a first code symbol being assigned to a first one of said displayable characters; and
   means for reading out at least a first one of said instruction sequences, wherein said first instruction sequence:
      represents said first displayable character by an image having at least two dimensions in a bitmap,
      defines a configuration of lines constituting said first displayable character, and
      includes a start command defining a start position in said bitmap and a first move command for tracing of a first line of said configuration of lines from said start position to a first end position in said bitmap, said first move command having a first direction and a first length instruction,
   wherein said bitmap is of dimension M and said first length instruction comprises a number of bits NL with $2^{NL} \geq \max(N_1, N_2, \ldots, N_M)$, wherein $N_1, N_2, \ldots, N_M$ represent a size of said bitmap in each respective dimension.

2. The system according to claim 1, wherein said first direction instruction comprises at least two bits, preferably defining north, east, south and west directions.

3. The system according to claim 1, wherein said first direction instruction comprises at least three bits, preferably defining north, northeast, east, southeast, south, southwest, west and northwest directions.

4. The system according to claim 1, wherein NL=3, NL=4, NL=5 or NL 6.

5. The system according to claim 1, wherein said first instruction sequence comprises at least a first color instruction.

6. The system according to claim 1, wherein said first instruction sequence comprises at least a second move command for tracing of a second line and said second move command comprises:
   a second direction instruction,
   a second length instruction and
   preferably a second color instruction.

7. The system according to claim 6, wherein said second line starts at said first end position and ends at a second end position in said bitmap.

8. The system according to claim 6, wherein said first instruction sequence comprises a plurality of move commands, wherein each of said move commands comprises
   a direction instruction,
   a length instruction and
   a color instruction.

9. The system of according to claim 6, wherein said first instruction sequence defines a continuous string of lines.

10. The system according to claim 6, wherein said first instruction sequence comprises at least a first subsequence indicator addressing a first subsequence representing a first predefined character element of said first character.

11. The system according to claim 1, wherein said first instruction sequence comprises a flag defining a first and second status and wherein said first status indicates the presence of a subsequence.

12. The system according to claim 1, comprising a screen buffer and means for writing at least portions of said first instruction sequence into said screen buffer using drawing primitives.

13. A data processing system for compressing digital data, in particular for the system according to claim 1, said data processing system comprising
   means for decomposing at least a portion of said digital data to a configuration of lines,
   means for assigning an instruction sequence to said configuration of lines, and
   storage means for storing said instruction sequence.

14. A method for compressing digital data, in particular for operating the system according to claim 13, said method comprising the steps of
   decomposing said digital data to a configuration of lines constituting a first character,
   assigning an instruction sequence to said configuration of lines, and
   storing said instruction sequence.

15. The system as described in claim 1, wherein said display is a display on a mobile electronic device.

16. A method for displaying digital data comprising the steps of:

receiving at least a first code symbol being assigned to a first displayable character;

allocating said first symbol to a first instruction sequence being stored on or in a storage medium and representing said first character by an image having at least two dimensions in a bitmap, wherein said first instruction sequence defines a configuration of lines constituting said first displayable character, and includes a start command defining a start position in said bitmap and a first move command, having a first direction and a first length instruction, for tracing of a first line of said configuration of lines from said start position to a first end position in said bitmap wherein said bitmap is of dimension M and said first length instruction comprises a number of bits NL with $2^{NL} \geq \max(N_1, N_2, \ldots, N_M)$, wherein $N_1, N_2, \ldots, N_M$ represent a size of said bitmap in each respective dimension;

reading out said first instruction sequence from said storage medium, and displaying said first character by tracing said configuration of lines.

17. A computer program product directly loadable into an internal memory of a digital computer, comprising software code portions for performing the steps of the method according to claim 16 when said product is run on the computer.

* * * * *